United States Patent
Yoon

(10) Patent No.: US 10,176,359 B2
(45) Date of Patent: Jan. 8, 2019

(54) METHOD AND DEVICE FOR ACQUIRING INPUTS

(71) Applicant: SAMSUNG ELECTRONICS CO., LTD., Suwon-si (KR)

(72) Inventor: Daekun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 15/350,276

(22) Filed: Nov. 14, 2016

(65) Prior Publication Data
US 2017/0344779 A1    Nov. 30, 2017

(30) Foreign Application Priority Data
May 30, 2016 (KR) .................. 10-2016-0066357

(51) Int. Cl.
*G06K 9/00* (2006.01)
*G06F 3/041* (2006.01)
*G06F 3/044* (2006.01)

(52) U.S. Cl.
CPC .......... *G06K 9/0002* (2013.01); *G06F 3/044* (2013.01); *G06F 3/0416* (2013.01); *G06F 2203/04106* (2013.01)

(58) Field of Classification Search
CPC ................ G06K 9/0002; G06F 3/044; G06F 2203/04106
See application file for complete search history.

(56) References Cited

U.S. PATENT DOCUMENTS

| | | | |
|---|---|---|---|
| 5,963,679 A | 10/1999 | Setlak | |
| 7,505,611 B2* | 3/2009 | Fyke | G06F 1/1626 |
| | | | 382/124 |
| 8,564,314 B2* | 10/2013 | Shaikh | G06K 9/0002 |
| | | | 324/658 |
| 8,866,347 B2 | 10/2014 | Benkley, III | |
| 9,542,026 B2* | 1/2017 | Lee | G06F 3/0412 |
| 9,721,142 B2* | 8/2017 | Russo | G06K 9/00114 |
| 2004/0239648 A1* | 12/2004 | Abdallah | G06F 21/32 |
| | | | 345/173 |
| 2008/0309631 A1* | 12/2008 | Westerman | G06F 1/3203 |
| | | | 345/173 |
| 2009/0309851 A1* | 12/2009 | Bernstein | G06F 3/0416 |
| | | | 345/174 |
| 2010/0214259 A1* | 8/2010 | Philipp | G06F 3/0416 |
| | | | 345/174 |
| 2011/0316799 A1* | 12/2011 | Lee | G06F 3/03547 |
| | | | 345/173 |
| 2012/0105081 A1* | 5/2012 | Shaikh | G06K 9/0002 |
| | | | 324/686 |

(Continued)

FOREIGN PATENT DOCUMENTS

| KR | 10-2013-0057637 A | 6/2013 |
|---|---|---|
| KR | 10-1432988 B1 | 8/2014 |
| KR | 10-1473184 B1 | 12/2014 |

*Primary Examiner* — Mihir K Rayan
(74) *Attorney, Agent, or Firm* — Sughrue Mion, PLLC

(57) ABSTRACT

A method of acquiring inputs is provided. The method may include determining one of a fingerprint recognition mode and a touch recognition mode as an input recognition mode of a display device, acquiring a fingerprint input based on information received from sensing lines of the display device, and acquiring a touch input by short-circuiting the sensing lines.

18 Claims, 9 Drawing Sheets

(56) References Cited

U.S. PATENT DOCUMENTS

| | | | | |
|---|---|---|---|---|
| 2013/0135247 A1* | 5/2013 | Na | ............................ | G06F 21/32 |
| | | | | 345/174 |
| 2013/0287272 A1* | 10/2013 | Lu | ............................ | G06F 3/041 |
| | | | | 382/124 |
| 2013/0287274 A1* | 10/2013 | Shi | ............................ | G06F 3/044 |
| | | | | 382/124 |
| 2015/0054764 A1* | 2/2015 | Kim | .................... | G06K 9/00013 |
| | | | | 345/173 |
| 2015/0227233 A1* | 8/2015 | Yi | ............................ | G06F 3/044 |
| | | | | 345/174 |

\* cited by examiner

Unit gain buffer

Trans-impedance amplifier

METHOD AND DEVICE FOR ACQUIRING INPUTS

CROSS-REFERENCE TO RELATED APPLICATION

This application claims priority from Korean Patent Application No. 10-2016-0066357, filed on May 30, 2016 in the Korean Intellectual Property Office, the disclosure of which is incorporated herein by reference in its entirety.

BACKGROUND

1. Field

Exemplary embodiments relate to methods and devices for acquiring a touch input and a fingerprint input.

2. Description of the Related Art

Products using touch screens have recently come into the market. Since a touch screen may replace a conventional input device such as a keyboard or a mouse that is operated in connection with a display device, the application areas of the touch screen are broad and diverse.

Furthermore, security technology using biological information has drawn much attention. Fingerprint information from among pieces of biological information is generally acquired by touch.

Therefore, a method of acquiring both a touch input and a fingerprint input using a touch screen is required.

SUMMARY

One or more exemplary embodiments provide methods and devices for acquiring a touch input and a fingerprint input.

According to an aspect of an embodiment, there is provided a method of acquiring inputs including: determining one of a fingerprint recognition mode and a touch recognition mode as an input recognition mode of a display device, acquiring a fingerprint input based on information received from each of sensing lines of the display device when the determined input recognition mode is the fingerprint recognition mode, and short-circuiting the sensing lines and acquiring a touch input based on information obtained from the short-circuited sensing lines when the determined input recognition mode is the touch recognition mode.

The information obtained from the short-circuited sensing lines may include information about mutual capacitance between the short-circuited sensing lines and driving lines adjacent to the short-circuited sensing lines.

An angle between the driving lines and the short-circuited sensing lines may be a preset angle or greater.

The acquiring of the fingerprint input may include obtaining, from each of the sensing lines, ridge-valley information indicating a ridge-valley on a surface of an object applying the fingerprint input, and acquiring the fingerprint information based on the obtained ridge-valley information.

The sensing lines used for the acquiring of the fingerprint input may be disposed in a preset region of the display device, and the acquiring of the fingerprint input may include acquiring the fingerprint input applied to the preset region.

When the determined input recognition mode is the fingerprint recognition mode, the sensing lines may be electrically isolated from a touch input recognition module configured to recognize a touch input to regions excluding the preset region, and when the determined input recognition mode is the touch recognition mode, the sensing lines may be electrically connected to the touch input recognition module.

The method of acquiring inputs may further include acquiring a touch input applied to regions excluding the preset region regardless of the determined input recognition mode.

The determining of the input recognition mode may include determining one of the fingerprint recognition mode and the touch recognition mode as the input recognition mode of the display device, based on a user input.

The determining of the input recognition mode may include alternately determining one of the fingerprint recognition mode and the touch recognition mode as the input recognition mode of the display device, according to a preset frequency.

The determining of the input recognition mode may include determining one of the fingerprint recognition mode and the touch recognition mode as the input recognition mode of the display device, based on a type of the acquired touch input.

According to an aspect of another embodiment, there is provided a display device including: a processor configured to determine one of a fingerprint recognition mode and a touch recognition mode as an input recognition mode of the display device, acquire a fingerprint input based on information received from each of sensing lines of the display device when the determined input recognition mode is the fingerprint recognition mode, and acquire a touch input based on information obtained from a switch when the determined input recognition mode is the touch recognition mode, and the switch configured to short-circuit the sensing lines and transmit information obtained from the short-circuited sensing lines to the processor when the determined input recognition mode is the touch recognition mode.

The information obtained from the short-circuited sensing lines may include information about mutual capacitance between the short-circuited sensing lines and driving lines adjacent to the short-circuited sensing lines.

An angle between the driving lines and the short-circuited sensing lines may be a preset angle or greater.

The processor may obtain, from each of the sensing lines, ridge-valley information indicating a ridge-valley on a surface of an object applying the fingerprint input, and acquire the fingerprint information based on the obtained ridge-valley information.

The sensing lines used for the acquiring of the fingerprint input may be disposed in a preset region of the display device, and the processor may acquire a fingerprint input applied to the preset region.

The switch may electrically isolate the sensing lines from a touch input recognition module configured to recognize a touch input to regions excluding the preset region when the determined input recognition mode is the fingerprint recognition mode, and may electrically connect the sensing lines to the touch input recognition module when the determined input recognition mode is the touch recognition mode.

The processor may acquire a touch input applied to regions excluding the preset region regardless of the determined input recognition mode.

The processor may determine one of the fingerprint recognition mode and the touch recognition mode as the input recognition mode of the device, based on a user input.

The processor may alternately determine one of the fingerprint recognition mode and the touch recognition mode as the input recognition mode of the device, according to a preset frequency.

A non-transitory computer-readable recording medium storing a program that is executable by a computer to perform the above method may further be provided.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
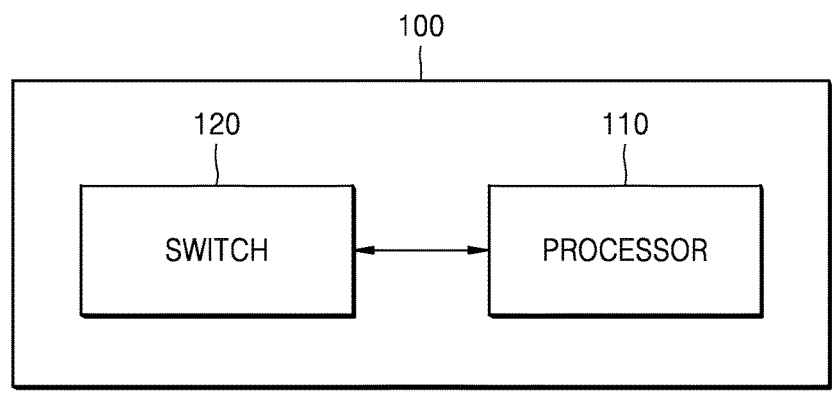
FIG. 1 is a block diagram of a device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In the present specification, the terms such as "comprise" or "include" should not be construed as necessarily including various elements or processes described in the specification, and it should be construed that some of the elements or the processes may not be included, or additional elements or processes may be further included.

It will be understood that, although the terms first, second, etc. may be used herein to describe various elements, these elements should not be limited by these terms. These terms are only used to distinguish one element from another.

FIG. 1 is a block diagram of a device 100 according to an exemplary embodiment.

As illustrated in FIG. 1, the device 100 may include a processor 110 and a switch 120. However, it is to be understood by those of ordinary skilled in the art that other general-purpose components may be further included in the device 100 in addition to the components shown in FIG. 1.

Furthermore, the processor 110 according to another exemplary embodiment may include a switch 120. For example, the switch 120 may be disposed in the processor 110 unlike in FIG. 1.

Hereinafter, the components will be sequentially described.

The processor 110 may determine one of a fingerprint recognition mode and a touch recognition mode as an input recognition mode of the device 100.

When the determined input recognition mode is a fingerprint recognition mode, the processor 110 may acquire a fingerprint input based on information received from the switch 120 or a sensing line.

When the determined input recognition mode is a touch recognition mode, the processor 110 may acquire a touch input based on information received from the switch 120 or the sensing line.

When the determined input recognition mode is a fingerprint recognition mode, the switch 120 may transmit fingerprint information applied from outside the device 100 to the processor 110. For example, when sensing lines of the device 100 obtain fingerprint information, the processor 110 may receive the fingerprint information via the switch 120 from the sensing lines.

When the determined input recognition mode is a touch recognition mode, the switch 120 may transmit touch information applied from outside the device 100 to the processor 110. For example, the processor 110 may receive touch information obtained from short-circuited sensing lines included in the device 100 via the switch 120.

Figure 2:
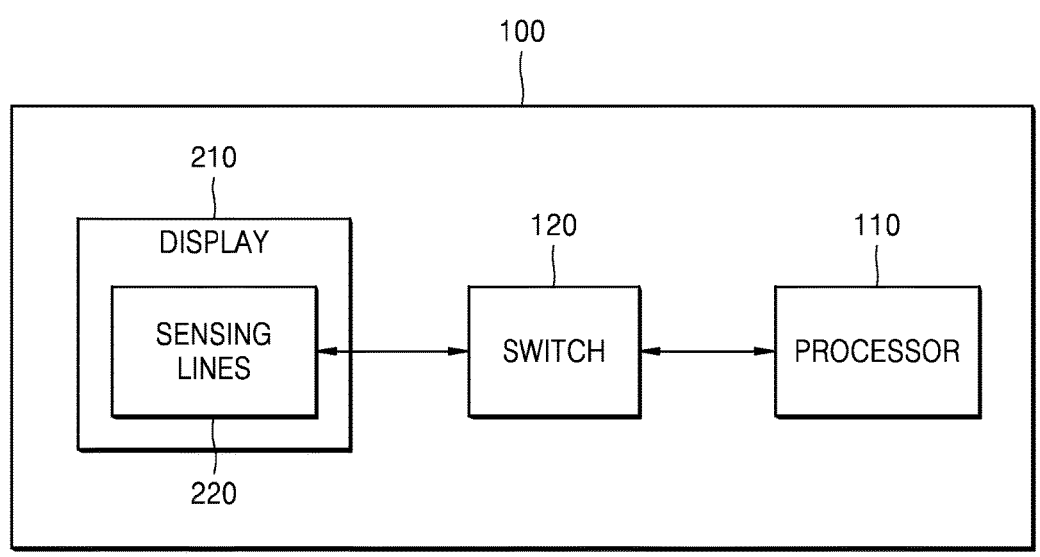
FIG. 2 is a block diagram of a device according to an exemplary embodiment.

FIG. 2 is a block diagram of the device 100 according to an exemplary embodiment.

As illustrated in FIG. 2, the device 100 may include the processor 110, the switch 120, a display 210, and sensing lines 220. However, it is to be understood by those of ordinary skilled in the art that other general-purpose components may be further included in the device 100 in addition to the components shown in FIG. 2.

Furthermore, the switch 120 according to another exemplary embodiment may be disposed in the processor 110 unlike in FIG. 2.

The processor 110 may determine one of a fingerprint recognition mode and a touch recognition mode as an input recognition mode of the device 100.

The device 100 may acquire a fingerprint input or a touch input from outside. For example, the processor 110 may acquire a fingerprint input or a touch input via an object contacting the display 210, according to a current input recognition mode of the device 100.

When the processor 110 determines the input recognition mode of the device 100 as the fingerprint recognition mode, the device 100 may obtain fingerprint information applied by the object contacting the display 210, and when the processor 110 determines the input recognition mode of the device 100 as the touch recognition mode, the device 100 may obtain touch information applied by the object contacting the display 210.

The processor 110 may determine one of the fingerprint recognition mode and the touch recognition mode as the input recognition mode of the device 100.

The processor 110 may determine one of the fingerprint recognition mode and the touch recognition mode as the input recognition mode of the device 100, based on a user input.

For example, according to a setting determined by the user input, the processor 110 may determine one of the fingerprint recognition mode and the touch recognition mode as the input recognition mode of the device 100.

As another example, according to a touch input method of a user, the processor 110 may determine one of the fingerprint recognition mode and the touch recognition mode as the input recognition mode of the device 100. For example, when a touch input applied to the display 210 by a user is a drag input, the processor 110 may determine the touch recognition mode as the input recognition mode of the device 100. As another example, when a touch input applied to the display 210 by a user is applied to the same region for the preset time or greater, the processor 110 may determine the fingerprint recognition mode as the input recognition mode of the device 100. As another example, when a pressure of the touch input applied to the display 210 by a user is recognized in the same region, the processor 110 may determine the fingerprint recognition mode as the input recognition mode of the device 100.

The processor 110 according to another exemplary embodiment may alternately determine one of the fingerprint recognition mode and the touch recognition mode as the input recognition mode of the device 100, according to a preset frequency.

For example, the device 100 may alternately determine one of the fingerprint recognition mode and the touch recognition mode as the input recognition mode of the device 100, 60 times per second. The device 100 may alternately acquire a fingerprint input and a touch input. Alternatively, the device 100 may determine the frequency of changing the fingerprint recognition mode and the touch recognition mode, based on performance of the device 100, the preset setting, or the user input.

As another example, the device 100 may alternately determine one of the fingerprint recognition mode and the touch recognition mode as the input recognition mode of the device 100, according to the preset frequency based on the user input. For example, when a simultaneous recognition mode is determined as the input recognition mode of the device 100 by the user input from among the fingerprint recognition mode, the touch recognition mode, and the simultaneous recognition mode, the device 100 may alternately determine one of the fingerprint recognition mode and the touch recognition mode as the input recognition mode of the device 100, according to the preset frequency.

When the determined input recognition mode is a fingerprint recognition mode, the processor 110 may acquire the fingerprint input based on information received from each of the sensing lines 220 included in the display 210.

For example, the sensing lines 220 included in the display 210 may obtain ridge-valley information indicating a ridge-valley on a surface of the object applying the fingerprint input, and may further obtain fingerprint information based on the obtained ridge-valley information. The fingerprint information obtained by the sensing lines 220 may be transmitted to the processor 110 via the switch 120. Alternatively, the fingerprint information obtained by the sensing lines 220 may be directly transmitted to the processor 110 without passing through the switch 120.

When the switch 120 is disposed in the processor 110, the fingerprint information obtained by the sensing lines 220 may be transmitted to the processor 110, and the switch 120 may transmit the fingerprint information to the fingerprint recognition module in the processor 110. The fingerprint recognition module may identify a fingerprint on the object applying the fingerprint input by using the obtained fingerprint information.

The sensing lines 220 transmitting information to the switch 120 may indicate one or more sensing lines corresponding to the preset region from among all of the sensing lines corresponding to the entire display 210. For example, when the number of all of the sensing lines is 100 and the number of the one or more sensing lines corresponding to the preset region is 10, the 10 sensing lines may be the sensing lines 220.

When the determined input recognition mode is a touch recognition mode, the switch 120 may short-circuit the sensing lines 220, and may transmit information obtained from the short-circuited sensing lines 220 to the processor 110, and the processor 110 may acquire a touch input by using the received information.

For example, when the determined input recognition mode is a touch recognition mode, the switch 120 may short-circuit some of the sensing lines 220 from among all of the sensing lines 220 included in the display 210, and may obtain information about mutual capacitance from the short-circuited sensing lines 220. The obtained information about mutual capacitance may be transmitted to the processor 110 through the switch 120, and the processor 110 may acquire a touch input by using the received information about mutual capacitance.

The information about mutual capacitance may include information about capacitance generated between the short-circuited sensing lines 220 and lines adjacent thereto. The adjacent lines may include driving lines. For example, the device 100 may obtain information about mutual capacitance between the short-circuited sensing lines 220 corresponding to a region to which a touch input is applied and the driving lines corresponding to the region to which a touch input is applied, and may sense the applied touch input by using the obtained information about mutual capacitance. As another example, the device 100 may short-circuit some or all of the driving lines, may obtain information about mutual capacitance between the short-circuited sensing lines 220 corresponding to a region to which a touch input is applied and short-circuited driving lines corresponding to the region to which a touch input is applied, and may sense the applied touch input by using the obtained information about mutual capacitance.

An angle between the sensing lines 220 and the driving lines may be determined within a preset range. For example, an acute angle between the sensing lines 220 and the driving lines may be 80 degrees or greater. As another example, an angle between the sensing lines 220 and the driving lines may be 90 degrees or greater within an error range of 5%.

With reference to the same touch input, a value of mutual capacitance acquired from the short-circuited sensing lines 220 is generally greater than that of mutual capacitance acquired from each of the sensing lines 220. Therefore, by short-circuiting the sensing lines 220 and obtaining information about mutual capacitance from the short-circuited sensing lines 220, the device 100 may sense a touch input at a higher speed than when obtaining information about mutual capacitance from each of the sensing lines 220.

Furthermore, when intervals between the sensing lines 220 have preset values or less, the device 100 may ensure a resolution level at which a fingerprint recognition is possible.

Therefore, the sensing lines 220 may acquire both the fingerprint input and the touch input.

Hereinafter, the method and the device 100 for acquiring inputs according to the present exemplary embodiment will be described in detail.

Figure 3:
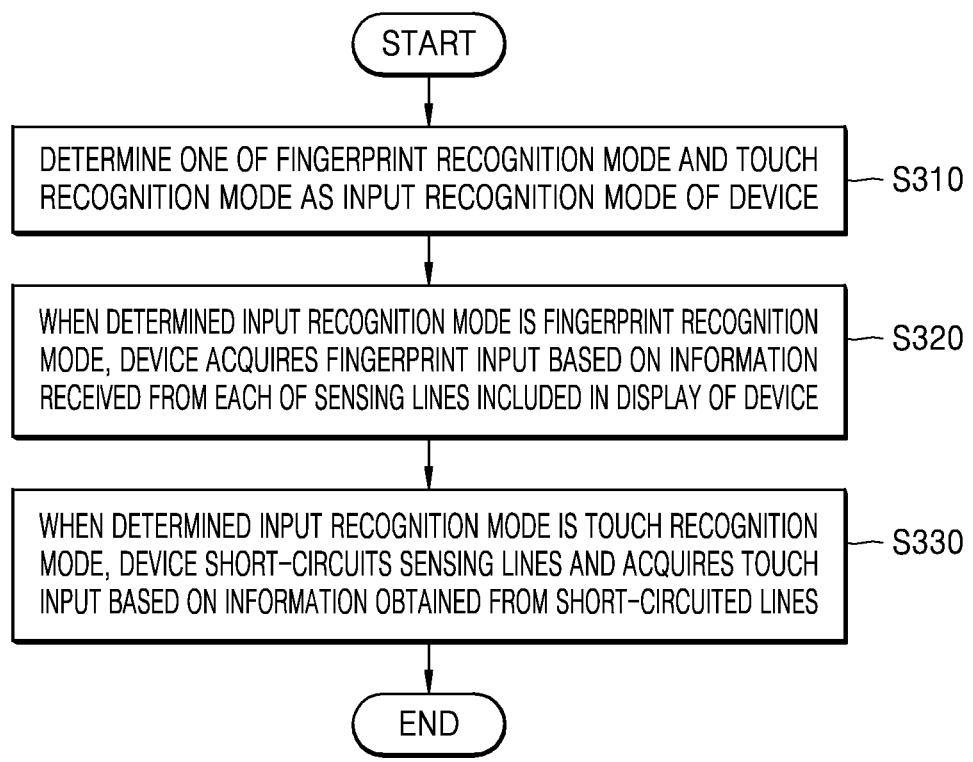
FIG. 3 illustrates a flowchart of a method of acquiring a fingerprint input or a touch input of a device according to an exemplary embodiment, according to a determined input recognition mode.

FIG. 3 is a flowchart of a method of acquiring a fingerprint input or a touch input of the device 100 according to an exemplary embodiment, according to a determined input recognition mode.

In operation S310, the device 100 may determine one of a fingerprint recognition mode and a touch recognition mode as an input recognition mode of the device 100.

When the determined input recognition mode is a fingerprint recognition mode, the device 100 may acquire a fingerprint input applied to the display 210.

The device 100 may acquire the fingerprint input by recognizing a surface of an object (e.g., finger) contacting the display 210. For example, the device 100 may recognize a ridge-valley of the object contacting the display 210, and may acquire the fingerprint input based on the recognized ridge-valley.

When the determined input recognition mode is a touch recognition mode, the device 100 may acquire a touch input applied to the display 210.

The device 100 may acquire the touch input by recognizing a position of the object contacting the display 210. For example, the device 100 may recognize the position of the object contacting or accessing the display 210, and may acquire the touch input based on the recognized position.

In operation S320, when the input recognition mode determined in operation S310 is a fingerprint recognition mode, the device 100 may acquire a fingerprint input based on information received from each of the sensing lines 220 included in the display 210 of the device 100.

The device 100 may include at least one sensing line. For example, sensing lines 220 may be included in the display 210 of the device 100.

The sensing lines 220 may be disposed in a preset region or the entire region of the display 210.

The sensing lines 220 may be used for acquiring a fingerprint input. For example, each of the sensing lines 220 may obtain ridge-valley information of a surface of an object adjacent to each of the sensing lines 220, and the device 100 may acquire a fingerprint input via the adjacent object through the obtained ridge-valley information.

When the input recognition mode determined in operation S310 is a fingerprint recognition mode, the sensing lines 220 may be electrically connected to a fingerprint recognition module, which is included in the processor 110, by the switch 120 or in another manner. When the input recognition mode determined in operation S310 is a fingerprint recognition mode, the sensing lines 220 may be electrically connected to the fingerprint recognition module by a circuit included in the fingerprint recognition module. When the input recognition mode determined in operation S310 is a fingerprint recognition mode, the sensing lines 220 may be electrically isolated from a touch recognition module, which is included in the processor 110, by the switch 120 or by the circuit included in the fingerprint recognition module.

In operation S330, when the input recognition mode determined in operation S310 is a touch recognition mode, the device 100 may short-circuit the sensing lines 220 and may acquire a touch input based on information obtained from the short-circuited sensing lines 220.

The sensing lines 220 may be used for acquiring the touch input.

For example, each of the sensing lines 220 may obtain information about mutual capacitance caused by the object adjacent to each of the sensing lines 220, and the device 100 may acquire a touch input via the adjacent object through the obtained information about mutual capacitance.

As another example, the device 100 may short-circuit some or all of the sensing lines 220, and may acquire a touch input through the information about mutual capacitance obtained from the short-circuited sensing lines 220. For example, the device 100 may obtain information about mutual capacitance between the short-circuited sensing lines 220 corresponding to a region to which a touch input is applied and driving lines corresponding to the region to which a touch input is applied, and may sense the applied touch input by using the obtained information about mutual capacitance. As another example, the device 100 may short-circuit some or all of the driving lines, may obtain information about mutual capacitance between the short-circuited sensing lines 220 corresponding to a region to which a touch input is applied and the short-circuited driving lines corresponding to the region to which a touch input is applied, and may sense the applied touch input by using the obtained information about mutual capacitance.

An angle between the sensing lines and the driving lines may be determined within a preset range. For example, an acute angle between the sensing lines and the driving lines may be 80 degrees or greater. As another example, an angle between the sensing lines and the driving lines may be 90 degrees or greater within an error range of 5%.

When the input recognition mode determined in operation S310 is a touch recognition mode, the sensing lines 220 may be electrically connected to the touch recognition module, which is included in the processor 110, by the switch 120 or in another manner. When the input recognition mode determined in operation S310 is a touch recognition mode, the sensing lines 220 may be electrically connected to the fingerprint recognition module by a circuit included in the touch recognition module. When the input recognition mode determined in operation S310 is a touch recognition mode, the sensing lines 220 may be electrically isolated from the fingerprint recognition module, which is included in the processor 110, by the switch 120 or by the circuit included in the touch recognition module.

The device 100 may determine a recognition mode of the device 100 as a touch recognition mode or a fingerprint recognition mode, and may acquire a fingerprint input or a touch input applied to a preset region. Furthermore, both of fingerprint recognition and touch recognition may be performed by the processor 110 included in the device 100.

Figure 4:
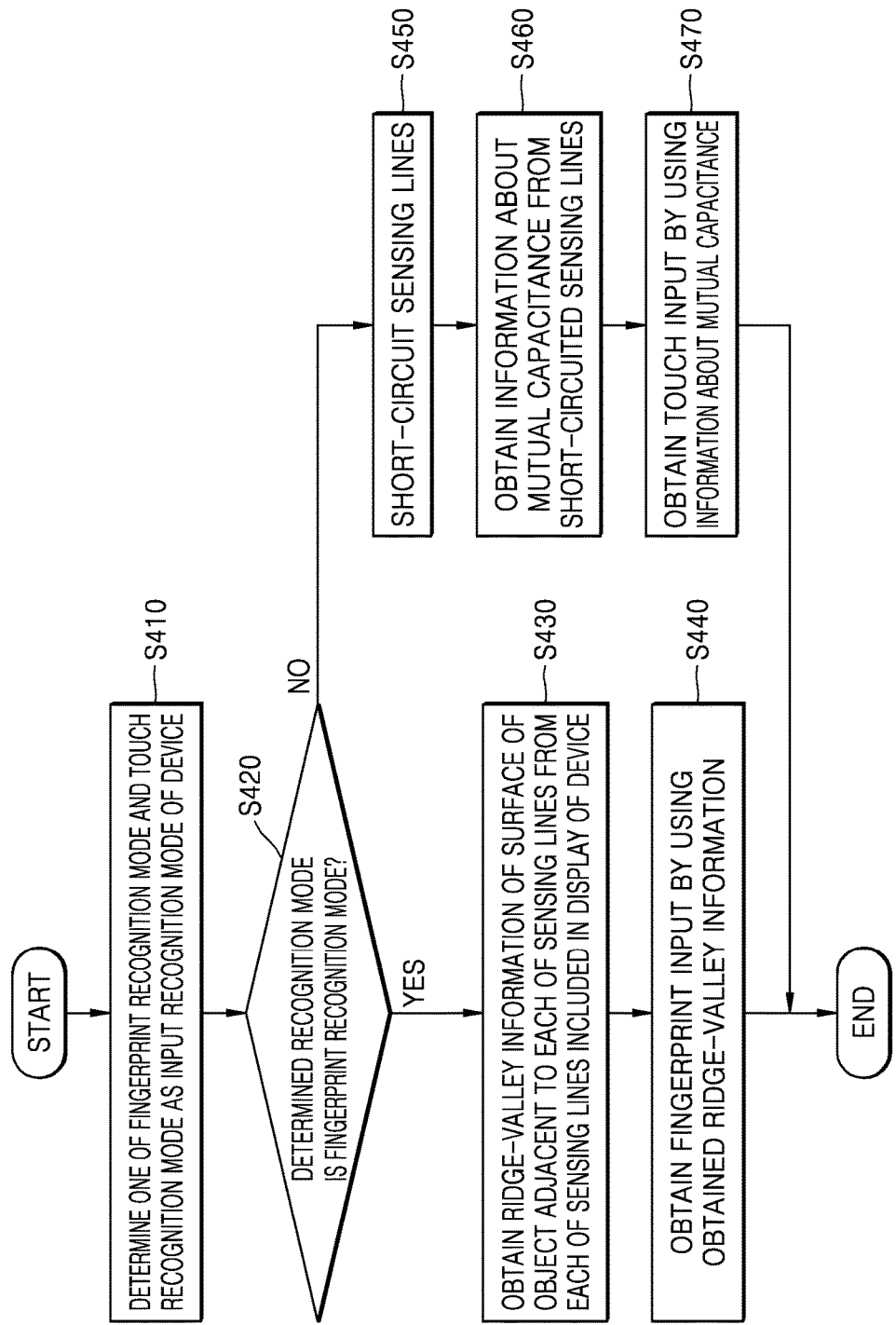
FIG. 4 is a flowchart of a method of acquiring a fingerprint input by using ridge-valley information or a touch input by using information about mutual capacitance of a device according to an exemplary embodiment, according to a determined input recognition mode.

FIG. 4 is a flowchart of a method of acquiring a fingerprint input by using ridge-valley information or a touch input by using information about mutual capacitance of the device 100, according to a determined input recognition mode.

As operation S410 corresponds to operation S310, detailed descriptions thereof will not be given for simplicity of explanation.

In operation S420, the device 100 determines whether the recognition mode determined in operation S410 is a fingerprint recognition mode.

For example, the device 100 may determine whether the recognition mode determined in operation S410 is a fingerprint recognition mode according to a flag value of 0 or 1. The device 100 may identify the recognition mode that was determined in operation S410 by identifying the flag value determined to correspond to the recognition mode.

In operation S430, the device 100 obtains ridge-valley information of a surface of an object adjacent to each of the sensing lines 220 from each of the sensing lines 220 included in the display 210 of the device 100.

The ridge-valley information according to an exemplary embodiment may include information distinguishing between a relatively concave portion (valley) and a relatively convex portion (ridge) on the surface of the object adjacent to each of the sensing lines 220.

The device 100 according to an exemplary embodiment may generate ridge-valley information distinguishing between a valley and a ridge on the surface of the object adjacent to each of the sensing lines 220 by recognizing or analyzing the surface.

In operation S440, the device 100 obtains a fingerprint input by using the ridge-valley information obtained in operation S430.

The device 100 may process the ridge-valley information obtained in operation S430 by using a preset method, and may recognize a fingerprint on the surface of the object adjacent to each of the sensing lines 220. For example, if an object applying a fingerprint input is an index finger, the device 100 may acquire the fingerprint input applied by the user by recognizing a fingerprint of the index finger.

In operation S450, the device 100 short-circuits the sensing lines 220.

For example, the device 100 may short-circuit some preset sensing lines 220 from among all of the sensing lines covering the entire region of the display 210. For example, if all of the sensing lines covering the entire region of the display 210 are 200 sensing lines having numbers from 1 to 200, and if some of the preset sensing lines 220 are 10 sensing lines having numbers from 51 to 60, the device 100 may short-circuit the 10 sensing lines and electrically connect them.

In operation S460, the device 100 obtains information about mutual capacitance from the short-circuited sensing lines 220. Furthermore, in operation S470, the device 100 obtains a touch input by using the information about mutual capacitance.

The device 100 may obtain a mutual capacitance value resulting from short-circuiting of the sensing lines due to the object applying the touch input, and the device 100 may acquire a touch input via an adjacent object through the obtained mutual capacitance value.

For example, the device 100 may obtain a mutual capacitance value generated between the sensing lines short-circuited by the object applying the touch input and short-circuited driving lines, and may sense the applied touch input by using the obtained mutual capacitance value.

The driving lines may be arranged to form a preset angle with the sensing lines. The device 100 may short-circuit some preset driving lines from among all of the sensing lines corresponding to the entire region of the display 210, may obtain a mutual capacitance value generated between the short-circuited sensing lines 220 and the short-circuited driving lines, and may determine whether a touch input is applied to the display 210 by using the obtained mutual capacitance value.

An angle between the sensing lines and the driving lines may be determined within a preset range. For example, an acute angle between the sensing lines and the driving lines may be 80 degrees or greater. As another example, an angle between the sensing lines and the driving lines may be 90 degrees or greater within an error range of 5%.

Figure 5:
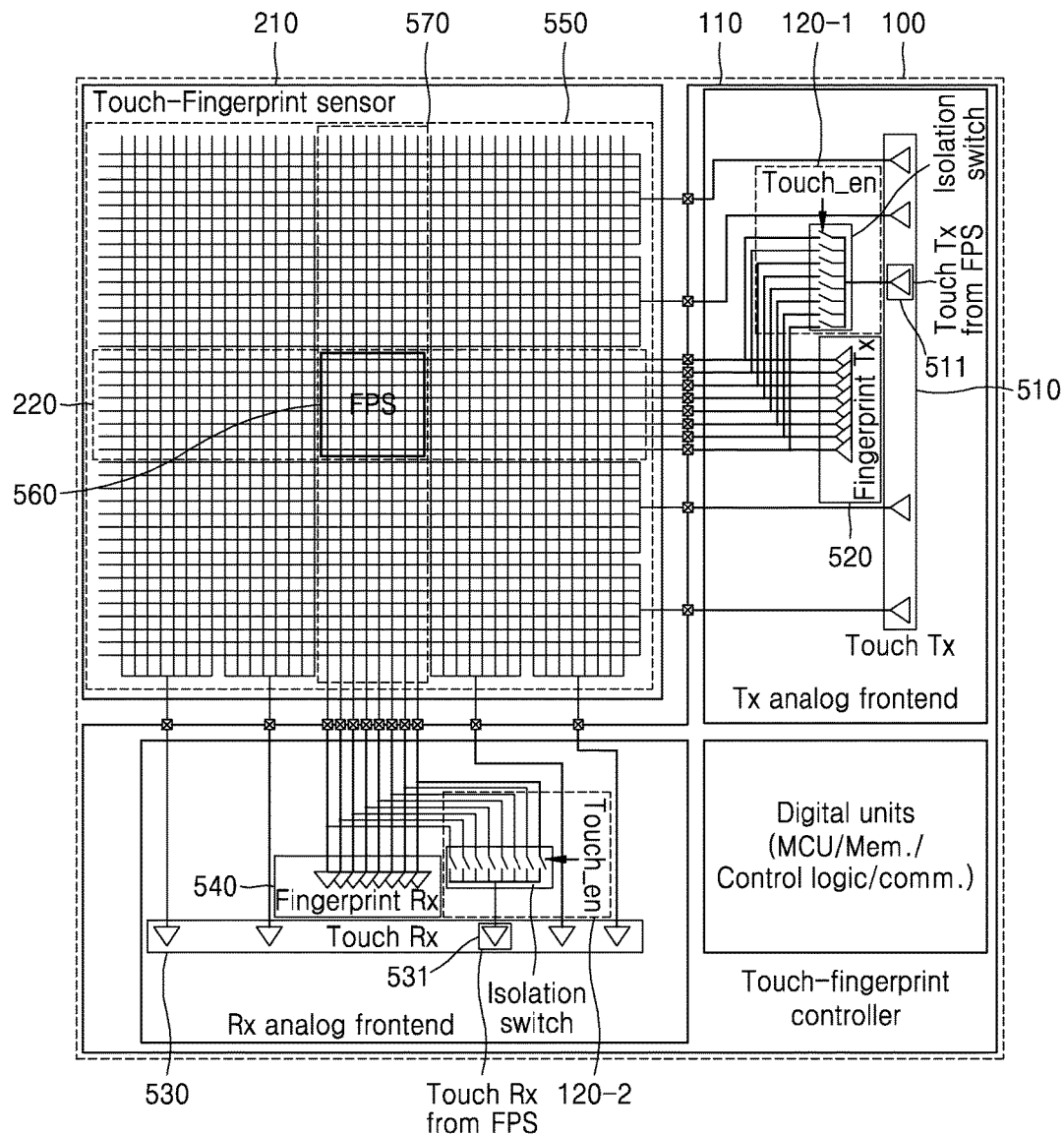
FIG. 5 is a block diagram illustrating a configuration of a device according to an exemplary embodiment.

FIG. 5 is a block diagram illustrating a configuration of the device 100 according to an exemplary embodiment.

As illustrated in FIG. 5, the device 100 may include the display 210 and the processor 110.

Furthermore, the display 210 may include a plurality of lines 550, including the sensing lines 220 and driving lines 570. Furthermore, a part of the entire region of the display 210 may be determined as a preset region 560. The preset region 560 may acquire both a fingerprint input and a touch input according to an input recognition mode of the device 100.

Furthermore, the processor 110 may include a first touch recognition module 510, a second touch recognition module 530, a first switch 120-1, a second switch 120-2, a first fingerprint recognition module 520, and a second fingerprint recognition module 540.

The first touch recognition module 510 may include a first transmitter 511 that activates the preset region 560 to obtain information from the sensing lines 220.

The second touch recognition module 530 may include a first receiver 531 acquiring a touch input of the preset region 560 by using information obtained from the sensing lines 570.

However, it is to be understood by those of ordinary skilled in the art that other general-purpose components may be further included in the device 100 in addition to the components shown in FIG. 5.

Furthermore, in addition to the exemplary embodiment shown in FIG. 5, a method and a device acquiring a touch input and a fingerprint input to a preset region may be realized according to the present disclosure.

The device 100 may acquire a fingerprint input or a touch input applied to the preset region 560 from among the entire region of the display 210, according to an input recognition mode determined by the processor 110.

The sensing lines 220 and driving lines 570 corresponding to the preset region 560 from among all of the lines 550 may be arranged at a preset angle. The method of acquiring inputs by using the sensing lines 220 and the driving lines 570 is only an example, and the present exemplary embodiment is not limited thereto. For example, the device 100 may acquire a fingerprint input or a touch input by using only the sensing lines 220 without the driving lines 570.

The device 100 according to an exemplary embodiment may not obtain fingerprint inputs applied to regions excluding the preset region 560. For example, the device 100 may obtain only fingerprint inputs from among inputs applied to regions excluding the preset region 560.

For example, the device 100 may short-circuit sensing lines corresponding to regions excluding the preset region 560 by a preset number of units, and may acquire a touch input by using information about mutual capacitance obtained from the short-circuited sensing lines 220.

As another example, the device 100 may short-circuit driving lines corresponding to regions excluding the preset region 560 by a preset number of units, and may acquire a touch input by using information about mutual capacitance obtained from the short-circuited driving lines.

Intervals of the sensing lines or driving lines may be identically maintained with respect to the regions excluding the preset region 560 as well as the preset region 560, and thus, the sensing lines or driving lines may not be recognized by naked eyes outside the display 210.

The sensing lines 220 may be isolated from each other when the determined input recognition mode of the device 100 is a fingerprint recognition mode, and may be short-circuited when the determined input recognition mode of the device 100 is a touch recognition mode.

It is assumed below that a fingerprint recognition mode is determined as an input recognition mode of the device 100, according to an exemplary embodiment.

The processor 110 may determine a Touch_en value applied to the first switch 120-1 or the second switch 120-2 as 0. The processor 110 may apply 0 as a Touch_en value to the first switch 120-1 or the second switch 120-2. A value of 0 or 1 is an arbitrarily determined value, and a value of Touch_en may be set as another value (e.g., 11 or 101).

When the first switch 120-1 receives 0 as a value of Touch_en, the first switch 120-1 may be turned off to prevent information applied from the preset region 560 from being transmitted to the first transmitter 511. The sensing lines 220 may be electrically isolated from the first touch recognition module 510 through the first switch 120-1.

The first fingerprint recognition module 520 may receive information applied from the preset region 560, and may obtain a fingerprint input by using the received information. For example, the first fingerprint recognition module 520 may obtain ridge-valley information corresponding to the fingerprint input applied to the preset region 560, and may acquire a fingerprint input of an object applying the fingerprint input based on the obtained ridge-valley information.

When the second switch 120-2 receives 0 as a value of Touch_en, the second switch 120-2 may be turned off to prevent information applied from the preset region 560 from being transmitted to the first receiver 531. The driving lines 570 may be electrically isolated from the second touch recognition module 530 through the second switch 120-2.

The second fingerprint recognition module 540 may receive information applied from the preset region 560, and may obtain a fingerprint input by using the received information. For example, the second fingerprint recognition module 540 may obtain ridge-valley information corresponding to the fingerprint input applied to the preset region 560, and may acquire a fingerprint input of an object applying the fingerprint input based on the obtained ridge-valley information.

It is assumed below that a touch recognition mode is determined as an input recognition mode of the device 100, according to an exemplary embodiment.

The processor 110 may determine a Touch_en value applied to the first switch 120-1 or the second switch 120-2 as 1. The processor 110 may apply 1 as a Touch_en value to the first switch 120-1 or the second switch 120-2. A value of 0 or 1 is an arbitrarily determined value, and a value of Touch_en may be set as another value (e.g., 11 or 101).

When the first switch 120-1 receives 1 as a value of Touch_en, the first switch 120-1 may transmit information applied from the preset region 560 to the first transmitter 511. The sensing lines 220 may be electrically connected to the first touch recognition module 510 through the first switch 120-1.

The first fingerprint recognition module 520 may block the information applied from the preset region 560. For example, the first fingerprint recognition module 520 may block the information applied from the preset region 560 by using an internal switch of the first fingerprint recognition module 520.

When the second switch 120-2 receives 1 as a value of Touch_en, the second switch 120-2 may transmit information applied from the preset region 560 to the first receiver 531. The driving lines 570 may be electrically connected to the second touch recognition module 530 through the second switch 120-2.

The second fingerprint recognition module 540 may block the information applied from the preset region 560. For example, the second fingerprint recognition module 540 may block the information applied from the preset region 560 by using an internal switch of the second fingerprint recognition module 540.

The preset region 560 may be disposed in a part of the display 210 as illustrated in FIG. 5, but may also be disposed over the entire region of the display 210. When the preset region 560 is the entire region of the display 210, all of the lines 550 may acquire a touch input and fingerprint input.

Figure 6:
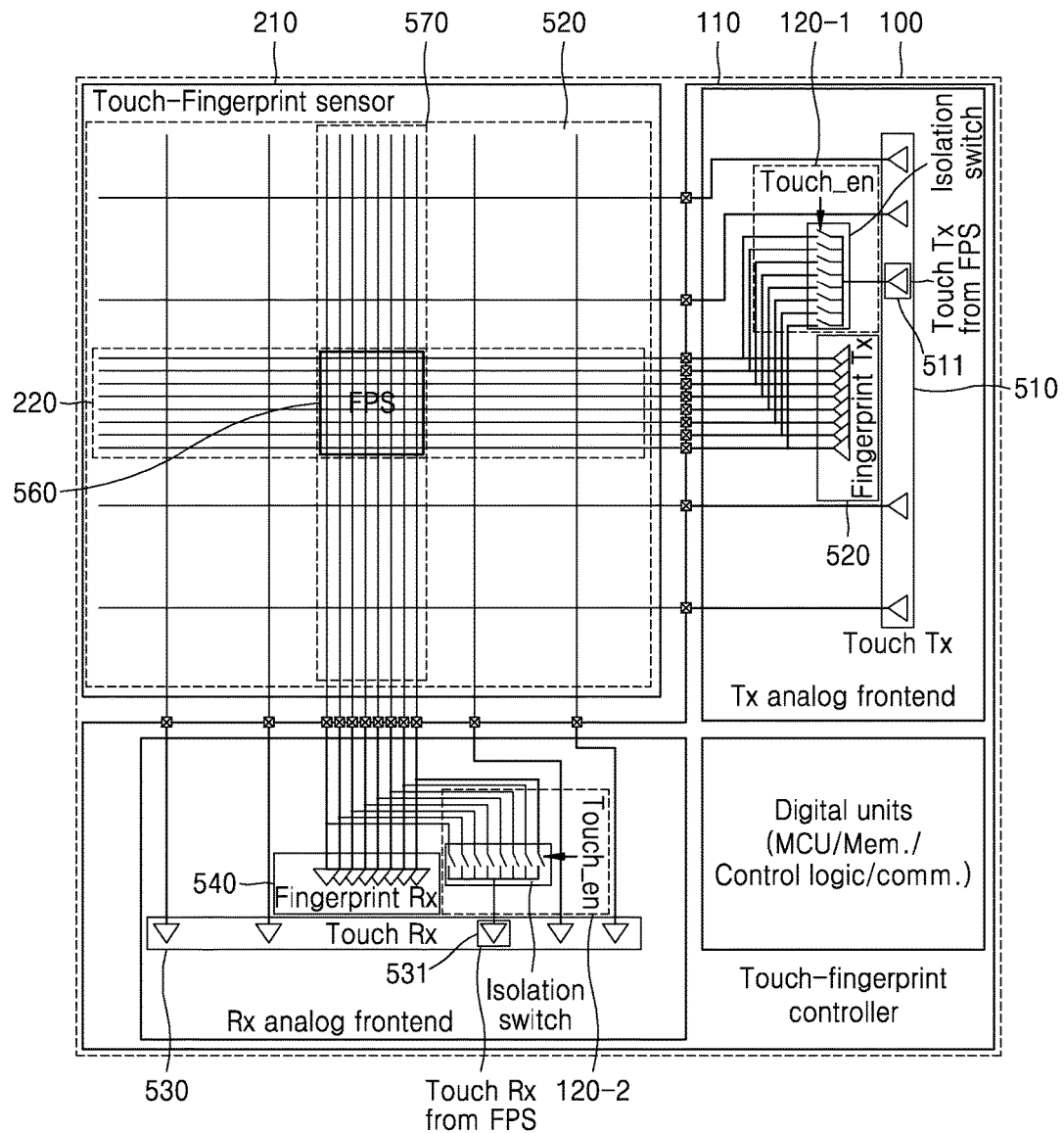
FIG. 6 is a block diagram illustrating a configuration of a device according to another exemplary embodiment.

FIG. 6 is a block diagram illustrating a configuration of the device 100 according to another exemplary embodiment.

Referring to FIG. 6, the device 100 may be realized using a smaller number of sensing lines or driving lines by increasing intervals between the sensing lines or the driving lines with respect to regions excluding the preset region 560. Since only touch inputs are obtained from the regions excluding the preset region 560 even when the intervals between the sensing lines or the driving lines with respect to the regions excluding the preset region 560 increase, performance with respect to acquiring inputs may be similar to when the intervals between the sensing lines or the driving lines are maintained.

Figure 7:
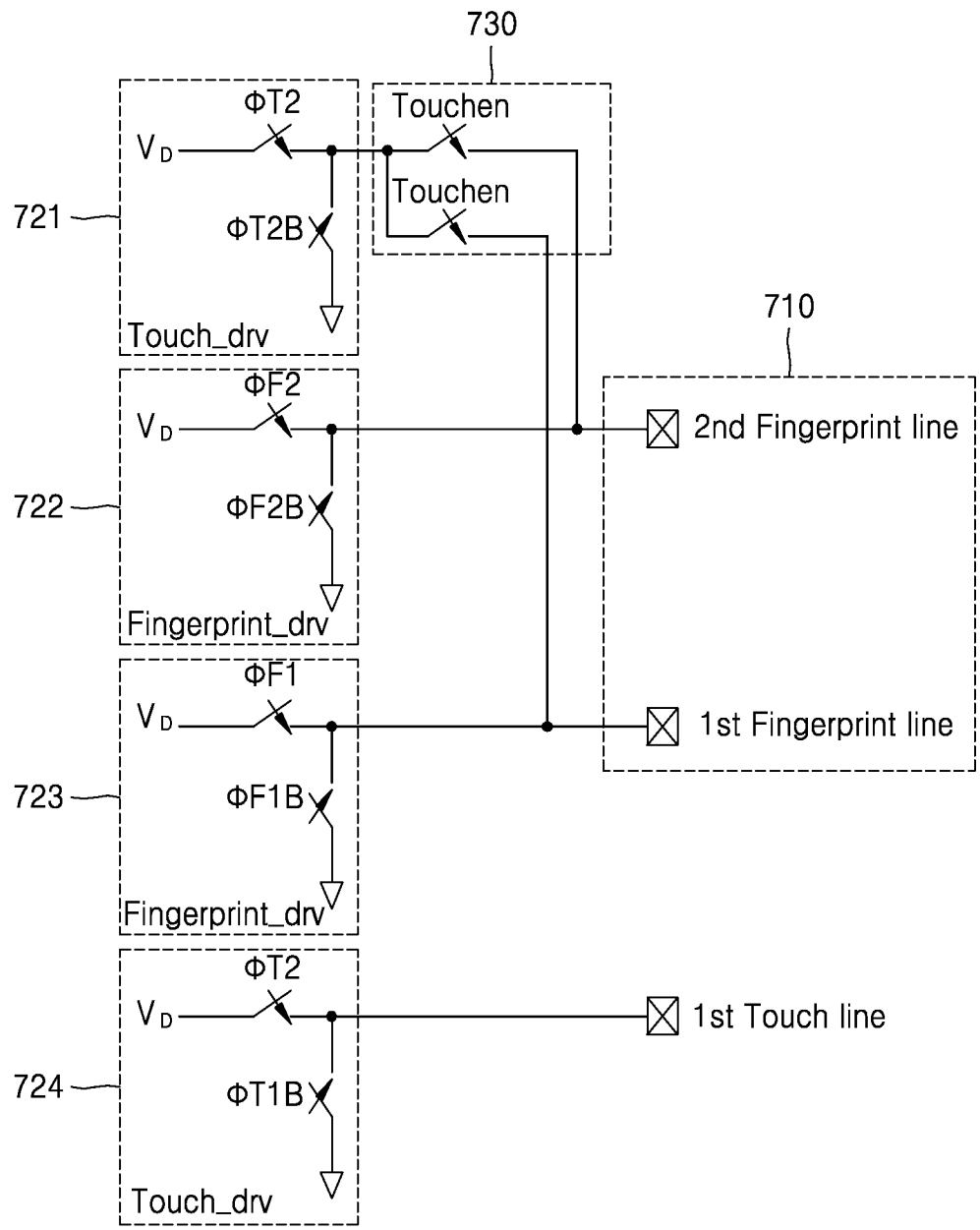
FIG. 7 is a block diagram illustrating fingerprint driver modules and touch driver modules, according to an exemplary embodiment.

FIG. 7 is a block diagram illustrating fingerprint driver modules and touch driver modules, according to an exemplary embodiment.

According to an exemplary embodiment, first and second fingerprint driver modules 722 and 723 may be included in the first fingerprint recognition module 520 or the second fingerprint recognition module 540.

According to an exemplary embodiment, first and second fingerprint driver modules 721 and 724 may be included in the first touch recognition module 510 or the second touch recognition module 530.

According to an exemplary embodiment, the first and second fingerprint driver modules 721 and 724, and the first and second fingerprint driver modules 722 and 723 may be connected to all of the lines 550, respectively. For example, the first touch driver module 721, and the first and second fingerprint driver modules 722 and 723 may be connected to the sensing lines 220.

It is assumed below that a fingerprint recognition mode is determined as an input recognition mode of the device 100, according to an exemplary embodiment.

As a Touch_en signal applied to a switch 730 becomes low and switches φF1 and φF2 are turned on, a voltage is applied to the first and second fingerprint driver modules 722 and 723. According to an exemplary embodiment, operations of the switches φF1 and φF2 and switches φF1B and φF2B may not overlap each other. Alternatively, operations of the switches φF1 and φF2 and the switches φF1B and φF2B may be mutually exclusive.

It is assumed below that a touch recognition mode is determined as an input recognition mode of the device 100, according to an exemplary embodiment.

As a Touch_en signal applied to the switch 730 becomes high and switches φT1 and φT2 are turned on, a voltage is applied to the first and second touch driver modules 721 and 724. Operations of the switches φT1 and φT2 and switches φT1B and φT2B may not overlap each other. Alternatively, operations of the switches φT1 and φT2 and the switches φT1B and φT2B may be mutually exclusive.

The switches φF1 and φF2, and φF1B and φF2B may be maintained in an open state, and the first and second fingerprint driver modules 722 and 723 may maintain a high-z state, and thus, inputs received from fingerprint sensing lines 710 may be blocked. Alternatively, the first and second fingerprint driver modules 722 and 723 may be electrically isolated from the fingerprint sensing lines 710.

When the Touch_en signal is high, two of the fingerprint sensing lines 710 may be operated as one virtual touch line. When the Touch_en signal is high, two of the fingerprint sensing lines 710 may be short-circuited to act as one line, and two of the short-circuited fingerprint sensing lines 710 may apply a signal to the first touch driver module 721. For example, two of the short-circuited fingerprint sensing lines 710 may apply a signal according to a change in mutual capacitance to the first touch driver module 721.

Figure 8:
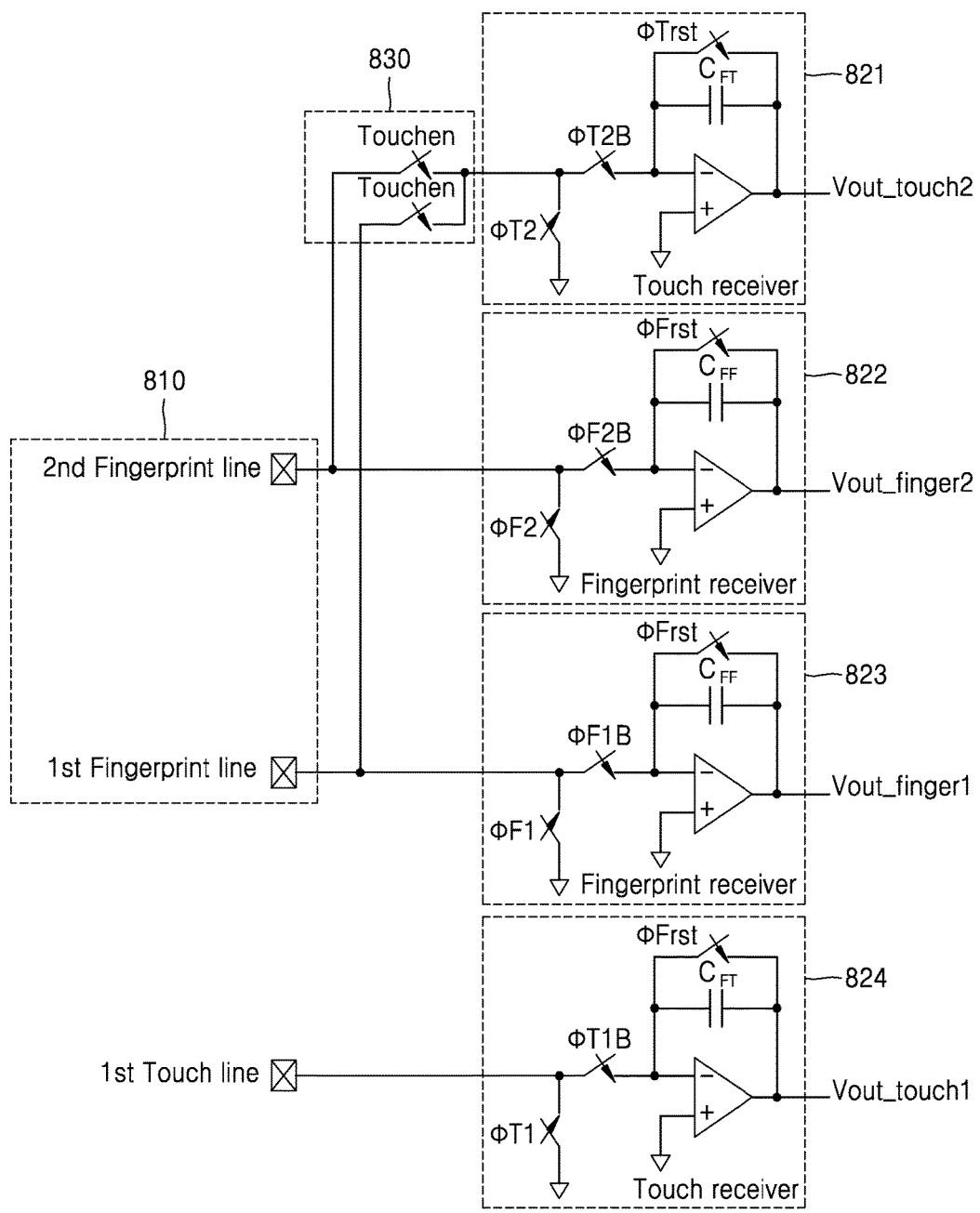
FIG. 8 is a block diagram illustrating fingerprint receiver modules and touch receiver modules, according to an exemplary embodiment.

FIG. 8 is a block diagram illustrating fingerprint receiver modules and touch receiver modules, according to an exemplary embodiment.

According to an exemplary embodiment, first and second fingerprint receiver modules 822 and 823 may be included in the first fingerprint recognition module 520 or the second fingerprint recognition module 540.

According to an exemplary embodiment, first and second touch receiver modules 821 and 824 may be included in the first touch recognition module 510 or the second touch recognition module 530.

According to an exemplary embodiment, the first and second touch receiver modules 821 and 824, and the first and second fingerprint receiver modules 822 and 823 may be connected to all of the lines 550, respectively. For example, the first touch receiver module 821, and the first and second fingerprint receiver modules 822 and 823 may be connected to the sensing lines 220.

It is assumed below that a fingerprint recognition mode is determined as an input recognition mode of the device 100, according to an exemplary embodiment.

As a Touch_en signal applied to a switch 830 becomes low and switches $\varphi F1$ and $\varphi F2$ are turned on, voltages Vout_finger1 and Vout_finger2, which are converted from charges of fingerprint sensing lines 810, may be output from the first and second fingerprint receiver modules 822 and 823. Operations of the switches $\varphi F1$ and $\varphi F2$ and switches $\varphi F1B$ and $\varphi F2B$ may not overlap each other. Alternatively, operations of the switches $\varphi F1$ and $\varphi F2$ and the switches $\varphi F1B$ and $\varphi F2B$ may be mutually exclusive.

It is assumed below that a touch recognition mode is determined as an input recognition mode of the device 100, according to an exemplary embodiment.

As a Touch_en signal applied to the switch 830 becomes high and switches $\varphi T1$ and $\varphi T2$ are turned on, voltages Vout_touch1 and Vout_touch2, which are converted from charges of the fingerprint sensing lines 810, may be output from the first and second touch receiver modules 821 and 824. Operations of the switches $\varphi T1$ and $\varphi T2$ and switches $\varphi T1B$ and $\varphi T2B$ may not overlap each other. Alternatively, operations of the switches $\varphi T1$ and $\varphi T2$ and the switches $\varphi T1B$ and $\varphi T2B$ may be mutually exclusive.

The switches $\varphi F1$ and $\varphi F2$, and $\varphi F1B$ and $\varphi F2B$ may be maintained in an open state, and the first and second fingerprint receiver modules 822 and 823 may maintain a high-z state, and thus, inputs received from the fingerprint sensing lines 810 may be blocked. Alternatively, the first and second fingerprint receiver modules 822 and 823 may be electrically isolated from the fingerprint sensing lines 810.

When the Touch_en signal is high, two of the fingerprint sensing lines 810 may be operated as one virtual touch line. When the Touch_en signal is high, two of the fingerprint sensing lines 810 may be short-circuited to act as one line, and two of the short-circuited fingerprint sensing lines 810 may apply a signal to the first touch receiver module 821. For example, two of the short-circuited fingerprint sensing lines 810 may apply a signal according to a change in mutual capacitance to the first touch receiver module 821.

Figure 9:
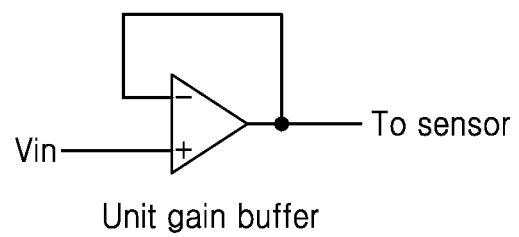
FIG. 9 is a view of a touch driver module or a fingerprint driver module, according to an exemplary embodiment.

FIG. 9 is a view of a touch driver module or a fingerprint driver module, according to an exemplary embodiment.

According to an exemplary embodiment, the touch driver module or the fingerprint driver module may be included in the first fingerprint recognition module 520, the second fingerprint recognition module 540, the first touch recognition module 510, or the second touch recognition module 530.

Referring to FIG. 9, the touch driver module or the fingerprint driver module according to an exemplary embodiment may be formed of a unit gain buffer capable of operating a continuous signal.

Figure 10:
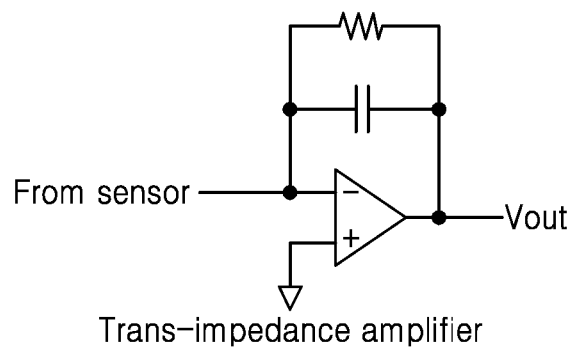
FIG. 10 is a view of a touch receiver module or a fingerprint receiver module, according to an exemplary embodiment.

FIG. 10 is a view of a touch receiver module or a fingerprint receiver module, according to an exemplary embodiment.

According to an exemplary embodiment, the touch receiver module or the fingerprint receiver module may be included in the first fingerprint recognition module 520, the second fingerprint recognition module 540, the first touch recognition module 510, or the second touch recognition module 530.

Referring to FIG. 10, the touch receiver module or the fingerprint receiver module may be formed of a trans-impedance amplifier capable of sensing a continuous signal.

Figure 11:
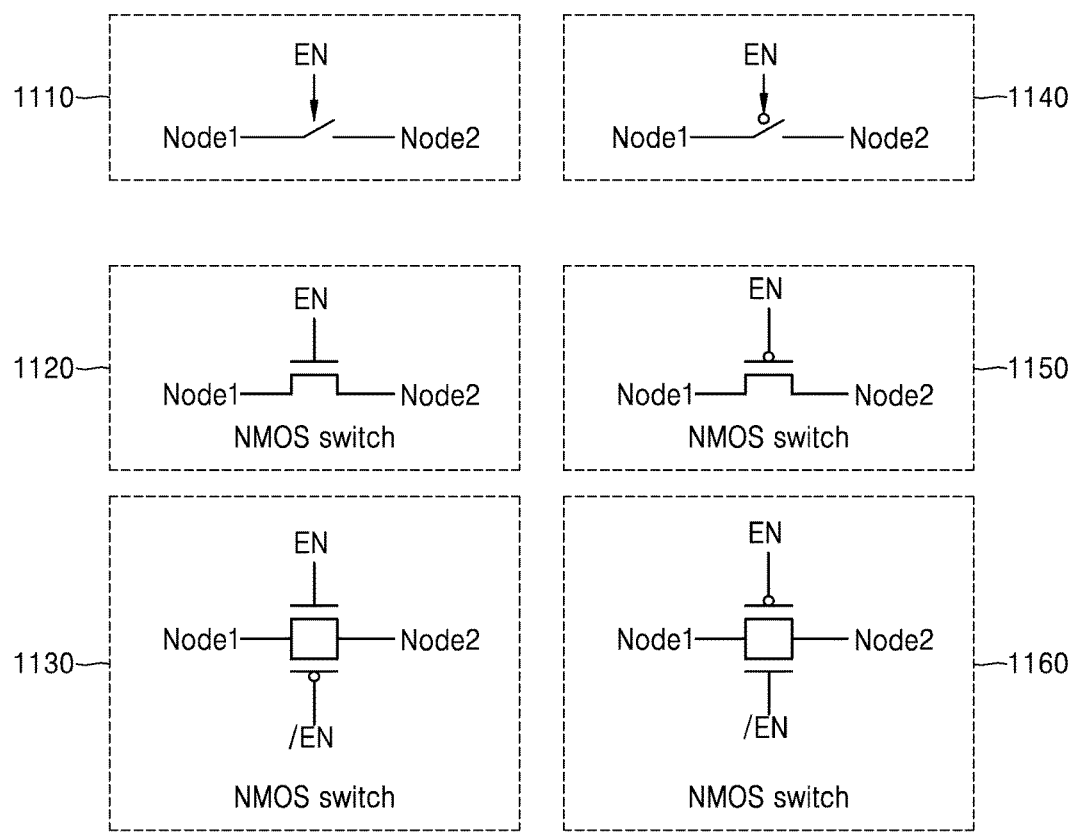
FIG. 11 is a view of a switch according to an exemplary embodiment.

FIG. 11 is a view of a switch according to an exemplary embodiment.

Referring to FIG. 11, the switch described in the above exemplary embodiment may be one of a first-1 switch 1110 or a second-1 switch 1140.

According to an exemplary embodiment, the first-1 switch 1110 may be realized by a first-1 n-channel metal-oxide-semiconductor (NMOS) switch 1120 or a first-2 NMOS switch 1130.

According to an exemplary embodiment, the first-1 switch 1110 may be realized by a second-1 NMOS switch 1150 or a second-2 NMOS switch 1160.

The switch illustrated in FIG. 11 is an example of a switch capable of being used as one of the above switches 120, 120-1, 120-2, 730, and 830, and the switch used as one of the above switches 120, 120-1, 120-2, 730, and 830 is not limited thereto.

The device described herein may comprise a processor, a memory for storing program data and executing it, a permanent locker unit such as a disk drive, a communication port for handling communications with external devices, and user interface devices including a touch panel, keys, buttons, etc. When software modules or algorithms are involved, these software modules may be stored as program instructions or computer-readable codes executable on a processor on a non-transitory computer-readable recording medium. Examples of the non-transitory computer-readable recording medium include magnetic storage media (e.g., ROM, RAM, floppy disks, hard disks, etc.), and optical recording media (e.g., CD-ROMs, digital versatile disks (DVDs), etc.). The non-transitory computer-readable recording medium can also be distributed over network-coupled computer systems so that the computer-readable code is stored and executed in a distributive manner. This media can be read by the computer, stored in the memory, and executed by the processor.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a", "an", and "the" and similar referents in the context of describing the inventive concept (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the inventive concept.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of acquiring inputs, the method comprising:
   determining one of a fingerprint recognition mode and a touch recognition mode as an input recognition mode of a display device;
   acquiring a fingerprint input based on information received from each of sensing lines in a preset region of the display device in response to the determined input recognition mode being the fingerprint recognition mode;
   electrically isolating sensing lines from a touch input recognition module configured to recognize a touch input to at least any one of the present region and an area outside the preset region in response to the determined input recognition mode being the fingerprint recognition mode; and
   short-circuiting the sensing lines and acquiring a touch input from the same preset region based on information obtained from the short-circuited sensing lines in response to the determined input recognition mode being the touch recognition mode.

2. The method of claim 1, wherein
   the information obtained from the short-circuited sensing lines comprises information about mutual capacitance between the short-circuited sensing lines and driving lines adjacent to the short-circuited sensing lines.

3. The method of claim 2, wherein
   an angle between the driving lines and the short-circuited sensing lines is a preset angle or greater.

4. The method of claim 1, wherein the acquiring of the fingerprint input comprises:
   obtaining, from each of the sensing lines, ridge-valley information indicating a ridge-valley on a surface of an object applying the fingerprint input; and
   acquiring the fingerprint input based on the obtained ridge-valley information.

5. The method of claim 1, wherein
   in response to the determined input recognition mode being the touch recognition mode, the sensing lines are electrically connected to the touch input recognition module.

6. The method of claim 1, further comprising:
   acquiring a touch input applied to regions excluding the preset region regardless of the determined input recognition mode.

7. The method of claim 1, wherein
   the determining of the input recognition mode comprises determining one of the fingerprint recognition mode and the touch recognition mode as the input recognition mode of the display device, based on a user input.

8. The method of claim 1, wherein
   the determining of the input recognition mode comprises alternately determining one of the fingerprint recognition mode and the touch recognition mode as the input recognition mode of the display device, according to a preset frequency.

9. The method of claim 1, wherein
   the determining of the input recognition mode comprises determining one of the fingerprint recognition mode and the touch recognition mode as the input recognition mode of the display device, based on a type of the acquired touch input.

10. A display device comprising:
    a processor configured to determine one of a fingerprint recognition mode and a touch recognition mode as an input recognition mode of the display device, acquire a fingerprint input based on information received from each of sensing lines in a preset region of the display device in response to the determined input recognition mode being the fingerprint recognition mode, and acquire a touch input from the same preset region based on information obtained from a switch in response to the determined input recognition mode being the touch recognition mode; and
    the switch configured to electrically isolate sensing lines from a touch input recognition module configured to recognize a touch input to at least any one of the preset region and an area outside the preset region in response to the determined input recognition mode being the fingerprint recognition mode, and short-circuit the sensing lines and transmit information obtained from the short-circuited sensing lines to the processor in response to the determined input recognition mode being the touch recognition mode.

11. The display device of claim 10, wherein
    the information obtained from the short-circuited sensing lines comprises information about mutual capacitance between the short-circuited sensing lines and driving lines adjacent to the short-circuited sensing lines.

12. The display device of claim 11, wherein
    an angle between the driving lines and the short-circuited sensing lines is a preset angle or greater.

13. The display device of claim 10, wherein
    the processor is further configured to obtain, from each of the sensing lines, ridge-valley information indicating a ridge-valley on a surface of an object applying the fingerprint input, and acquire the fingerprint information based on the obtained ridge-valley information.

14. The display device of claim 10, wherein
the switch is further configured to electrically connect the sensing lines to the touch input recognition module in response to the determined input recognition mode being the touch recognition mode.

15. The display device of claim 10, wherein
the processor is further configured to acquire a touch input applied to regions excluding the preset region regardless of the determined input recognition mode.

16. The display device of claim 10, wherein
the processor is further configured to determine one of the fingerprint recognition mode and the touch recognition mode as the input recognition mode of the display device, based on a user input.

17. The display device of claim 10, wherein
the processor is further configured to alternately determine one of the fingerprint recognition mode and the touch recognition mode as the input recognition mode of the display device, according to a preset frequency.

18. A non-transitory computer-readable recording medium storing a program that is executable by a computer to perform the method of claim 1.

* * * * *